United States Patent
Nomura et al.

(10) Patent No.: US 6,870,470 B2
(45) Date of Patent: Mar. 22, 2005

(54) ANGLE SENSOR AND CAR USING THE SAME

(75) Inventors: Toshihiro Nomura, Fukui (JP); Satoru Fukui, Fukui (JP); Masahide Onishi, Fukui (JP); Yoshiyuki Nakade, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 527 days.

(21) Appl. No.: 10/196,088

(22) Filed: Jul. 16, 2002

(65) Prior Publication Data

US 2003/0020461 A1 Jan. 30, 2003

(30) Foreign Application Priority Data

Jul. 18, 2001 (JP) .......................................... 2001-217773

(51) Int. Cl.[7] .................................................. B60Q 1/00
(52) U.S. Cl. ...................................... 340/441; 340/439
(58) Field of Search ................................ 340/438, 439, 340/686.1, 686.2, 686.3, 687, 435, 441; 701/41, 42, 23; 180/443, 446

(56) References Cited

U.S. PATENT DOCUMENTS

| 5,513,523 | A | * | 5/1996 | Sekiya et al. ................. 73/146 |
| 5,608,394 | A | * | 3/1997 | Hirabayashi ................. 341/11 |
| 5,907,277 | A | * | 5/1999 | Tokunaga ................... 340/441 |
| 5,925,082 | A | * | 7/1999 | Shimizu et al. ............... 701/41 |
| 5,930,905 | A |   | 8/1999 | Zabler et al. ............... 33/1 PT |
| 6,367,576 | B1 | * | 4/2002 | Rodenas et al. ............ 180/446 |
| 6,528,959 | B2 | * | 3/2003 | Kitano et al. ................. 318/55 |

FOREIGN PATENT DOCUMENTS

JP          63-284064       11/1988

* cited by examiner

Primary Examiner—Van T. Trieu
(74) Attorney, Agent, or Firm—RatnerPrestia

(57) ABSTRACT

An angle sensor can be re-mounted properly. This angle sensor includes a detecting sensor that detects a turned volume of a rotary shaft, and a governor connected to the detecting sensor. The governor includes a comparator that compares a turned angle data obtained before the angle sensor is detached with a turned angle data obtained after the angle sensor is re-mounted. This angle sensor produces a remarkable advantage when it is used in cars which are governed using the data about a turned volume of the steering wheel or the shaft.

10 Claims, 9 Drawing Sheets

Rotated angle of rotary body 102, 107

ANGLE SENSOR AND CAR USING THE SAME

FIELD OF THE INVENTION

The present invention relates to an angle sensor and a car employing the same angle sensor in its steering device.

BACKGROUND OF THE INVENTION

Recently numbers of cars employ an electronic governor, which detects a steered amount of angular rotation of the steering wheel with an angle sensor, thereby controlling the brake, suspension and accelerator at, e.g., a sharp curve, for safe driving.

Some angle sensors have two gears rotating along with steering and having phase difference each other, and detect the amount of angular rotation of steering from the angle of the two gears. However, such kinds of sensor might have error of the angle of the two gears because of backlash. Especially it might occur at the start of rotating, and complicated calculation is necessary to obtain the amount of angular rotation of steering.

More over, even those problems might be solved, if the angle sensor is detached from the car for, e.g., repairing, the angle sensor should be remounted at the right place, otherwise, it misleads a driver instead of contributing to the safe driving. To be more specific, there are following problems in detaching and remounting the angle sensor.

Before the angle sensor is detached from the car, the sensor indicates data of a turned angle data (steered angle data) responsive to the status of the tire with respect to the car body. Once the angle sensor is detached from the car, and if the sensor is re-mounted to the car with some deviation by mistake, the steered angle data obtained after the re-mounting differs from the data obtained before the detachment of the sensor. However, the electronic governor of the car controls various items based on this wrong "steered angle data". In this case, since a status of the tire with respect to the car body does not match the steered angle data, the angle sensor misleads the driver instead of aiding the driver in driving safely.

SUMMARY OF THE INVENTION

An angle sensor of the present invention includes the following two elements:
  a detecting sensor for detecting a steered amount of angular rotation of a steering wheel or that of a shaft; and
  a governor coupled with the detecting sensor and having a comparator for comparing the steered-angle data obtained before detaching the angle sensor with that obtained after re-mounting the angle sensor. This structure allows a comparison between the steered angle data obtained before the detaching and that obtained after the re-mounting. If the comparison finds discrepancy between the two data, it is determined that the angle sensor is improperly mounted. The car employing this angle sensor of the present invention can prevent inconveniences due to an improper mounting condition of the angle sensor.

DETAILED DESCRIPTION OF EXEMPLARY EMBODIMENT

Exemplary Embodiment 1

Figure 1:
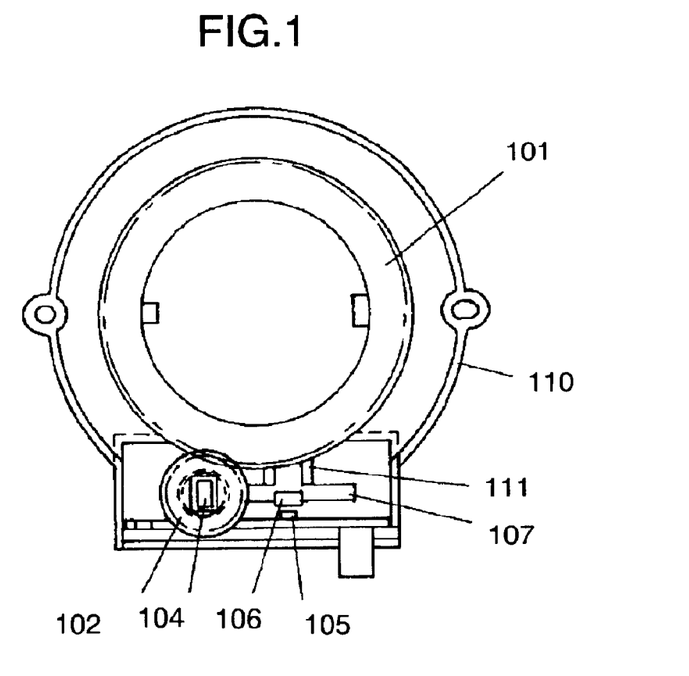
FIG. 1 is a plan view illustrating a rotational-angle detecting sensor in accordance with the first embodiment of the present invention.
Figure 2:
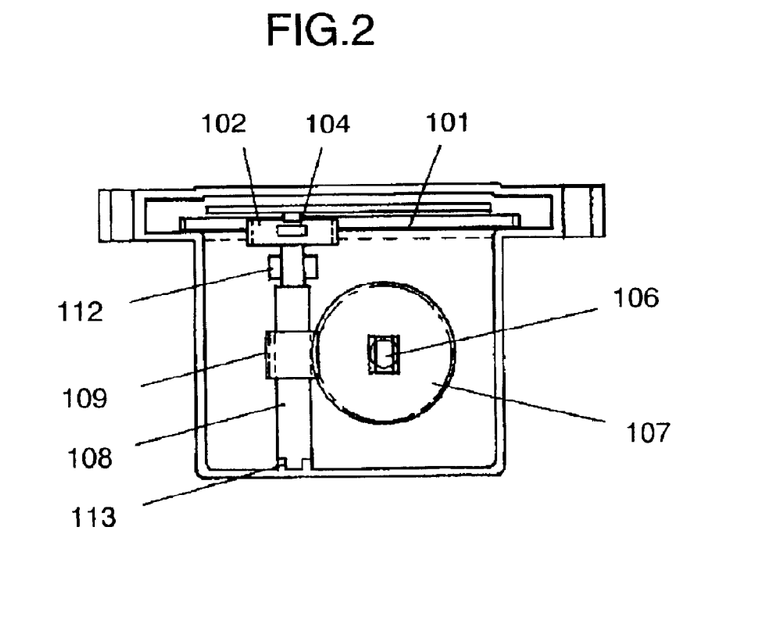
FIG. 2 is a partially cut-away front view of the rotational-angle detecting sensor in accordance with the first embodiment of the present invention.
Figure 3:
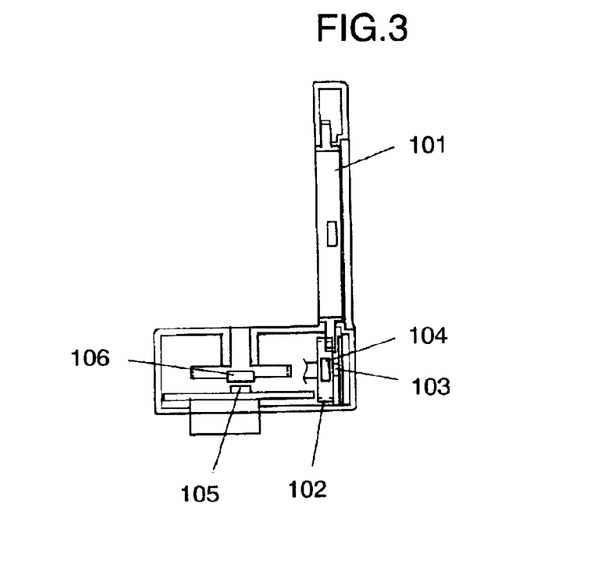
FIG. 3 is a partially cut-away lateral view of the same detecting sensor in accordance with the first embodiment of the present invention.
Figure 4:
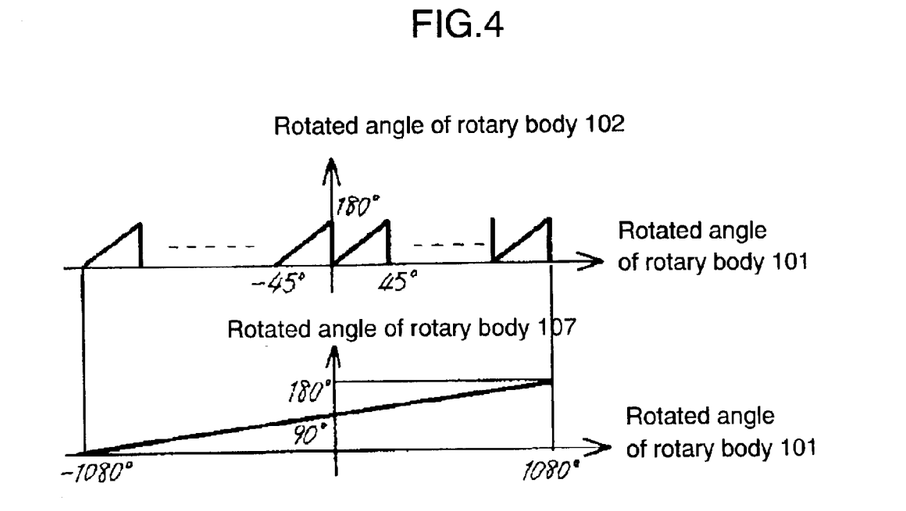
FIG. 4 is an illustration of relation of rotational angles between first rotary body, second rotary body and third rotary body disposed in the same detecting sensor in accordance with the first embodiment of the present invention.
Figure 5:
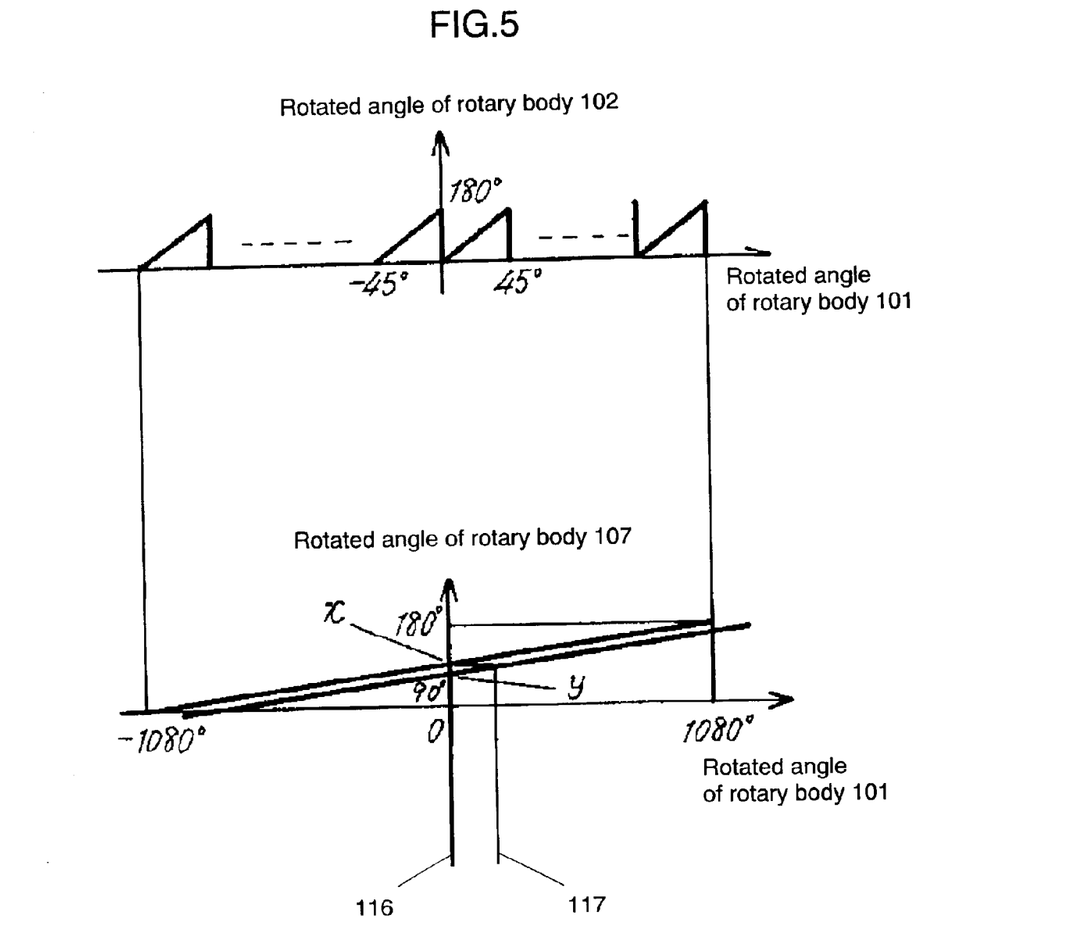
FIG. 5 is another illustration of relation of rotational angles between first rotary body, second rotary body and third rotary body in accordance with the first embodiment of the present invention.
Figure 6:
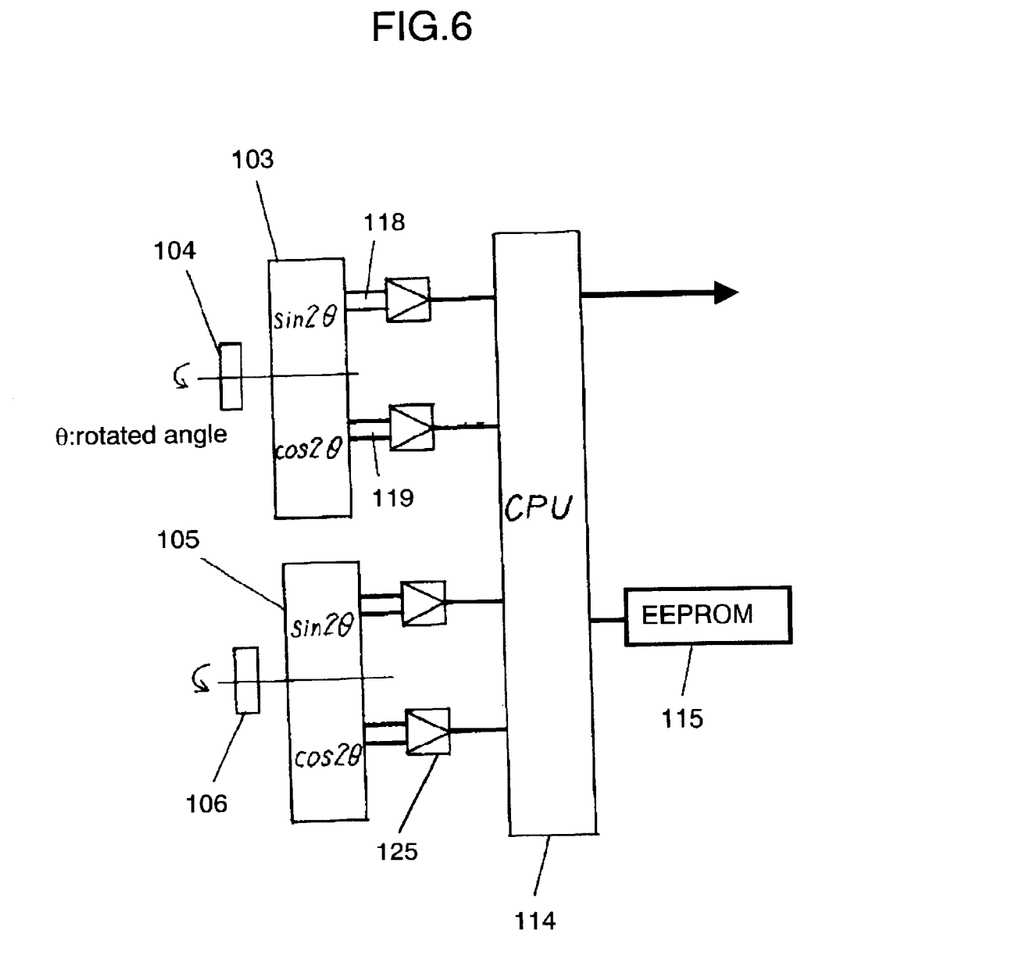
FIG. 6 is a block diagram illustrating relation between first detecting means, second detecting means and microprocessor in accordance with the first embodiment of the present invention.
Figure 7:
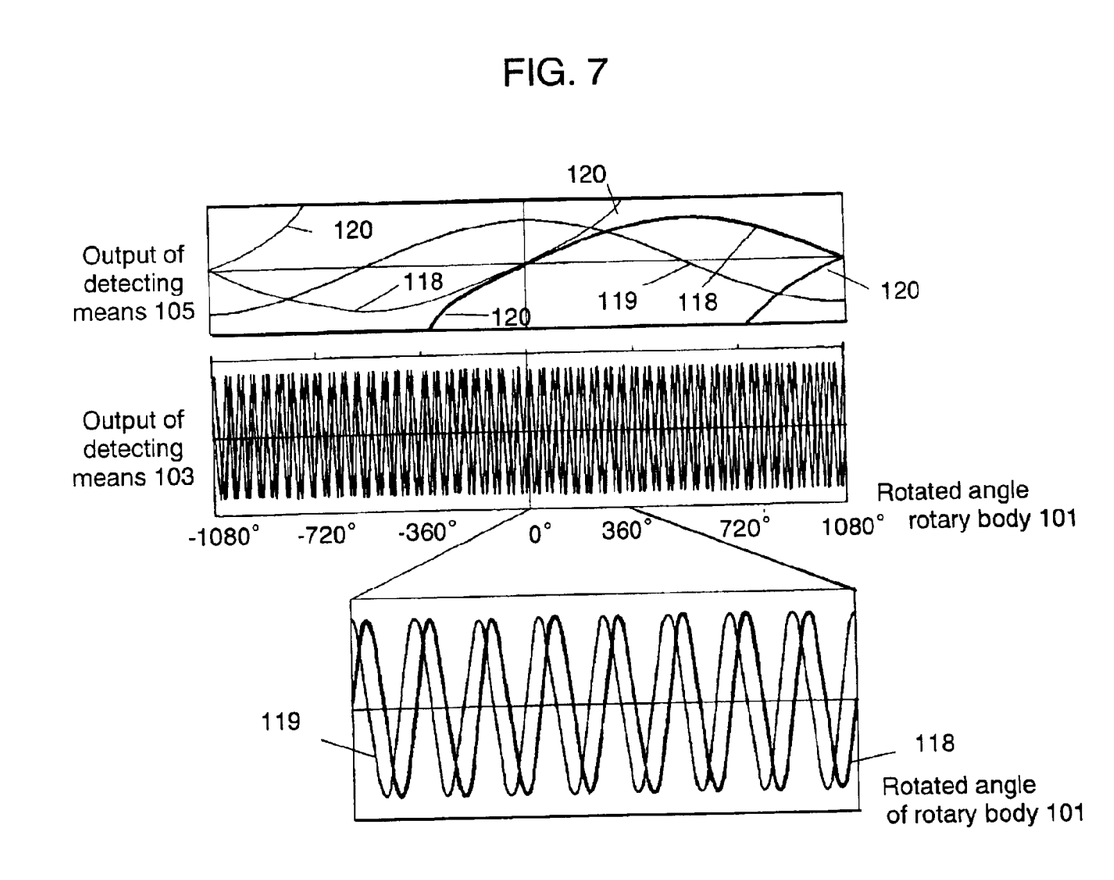
FIGS. 7 and 8 are illustrations of output signals of detecting means 103 and 105.
Figure 8:
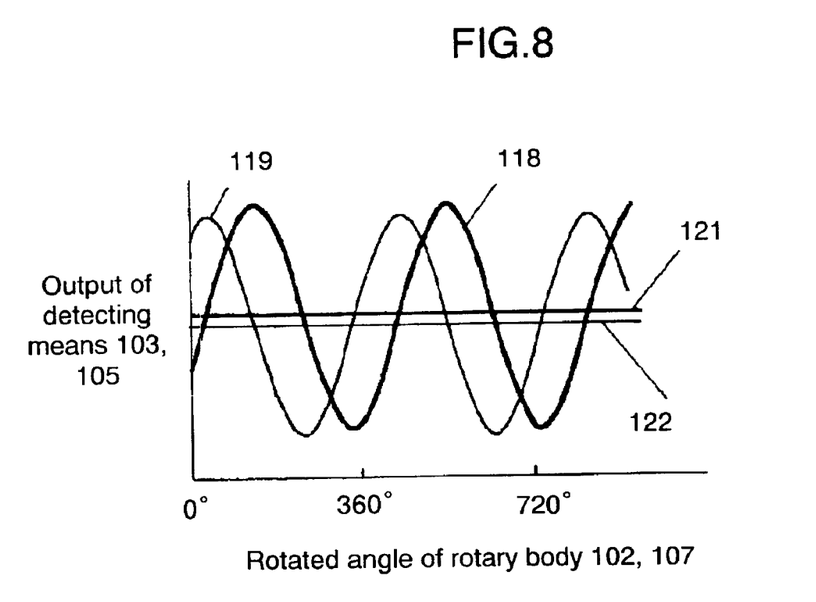

At first, a detecting sensor is detailed. FIG. 1 is a plan view illustrating a rotational-angle detecting sensor in accordance with the first embodiment of the present invention. FIG. 2 is a partially cut-away front view of the rotational-angle detecting sensor. FIG. 3 is a partially cut-away lateral view of the same detecting sensor. FIG. 4 illustrates relation of rotational angles between first rotary body 101, second rotary body 102 and third rotary body 107 disposed in the same detecting sensor. FIG. 5 also illustrates relation of rotational angles between first rotary body 101, second rotary body 102 and third rotary body 107. FIG. 6 is a block diagram illustrating relation between first detecting means 103, second detecting means 105 and micro-processor 114. FIGS. 7 and 8 show output signals of detecting means 103 and 105.

In FIG. 1 through FIG. 3, second rotary body 102 including a gear wheel on its outer wall is coupled with first rotary body 101 including also a gear wheel on its outer wall, and second rotary body 102 spins faster than first rotary body 101. First detecting means 103 (detecting anisotropic magnetism) detects a magnetic-field direction of magnet 104 that spins together with rotary body 102. This first detecting means 103 is mounted in front of a center of rotary body 102 so that detecting means 103 faces magnet 104. Second detecting means 105 (detecting anisotropic magnetism)

detects a magnetic-field direction of magnet 106 that spins together with third rotary body 107. This second detecting means 105 is mounted in front of a center of rotary body 107 so that second detecting means 105 faces magnet 106. Detecting means 103 is placed just below magnet 104, thus rotation of rotary body 102 changes a direction of magnetic force extending through detecting means 103, thereby altering an output of detecting means 103. In the same manner, rotation of rotary body 107 changes a magnetic force direction extending through detecting means 105, thereby altering an output of detecting means 105.

Shaft 8 rigidly mounted to rotary body 102 is regulated position by bearings 112 and 113 provided to housing 110. Worm gear 109 is rigidly mounted to shaft 108 and coupled with a wheel gear provided on an outer wall of rotary body 107. Rotary body 107 is regulated position by bearing 111 provided to housing 110, and spins at a slower speed than rotary body 101.

A gear wheel of rotary body 101 is linked with that of rotary body 102. Rotation of rotary body 101 rotates rotary body 102 at a faster speed than rotary body 101 based on a ratio of respective numbers of teeth. The wheel gear of rotary body 107 is linked with worm gear 109, and rotation of rotary body 102 rotates shaft 108 and worm gear 109 at slower speeds based on a ratio of given numbers of respective teeth.

Next, a method of detecting a rotational angle of the rotary bodies is demonstrated hereinafter. In FIG. 1, rotation of rotary body 101 entails rotary body 102 to rotate due to the gear wheel on the outer wall of rotary body 101 and that on the outer wall of rotary body 102. Assuming that a number of teeth of the gear wheel of rotary body 101 is "L", that of rotary body 102 is "M", and a speed reduction ratio of worm gear 109 vs. the wheel gear toothed on rotary body 107 is "N", then rotary body 102 spins at a speed of L/M times with respect to rotary body 101. Rotary body 102 rotates shaft 108 and worm gear 109 at the same speed.

Worm gear 109 rotates rotary body 107 at a speed of "N" times with respect to worm gear 109. If a number of rotations is focused, one rotation of rotary body 101 corresponds to L/M rotations of rotary body 102 and (L/M)×"N" rotations of rotary body 107. An appropriate selection of the numbers of teeth "L", "M" and the speed reduction ratio "N" allows rotary body 107 to rotate slower enough than rotary body 101 as well as rotary body 102 to rotate faster enough than rotary body 101. Thus, detecting means 105 detects a rough absolute angle which indicates how many turns rotary body 101 has done from the initial position, and detecting means 103 detects a fine absolute angle which shows how many degrees rotary body 101 rotates.

Relation of rotational angles between rotary bodies 101, 102 and 107 is described hereinafter with reference to FIG. 4. Assuming "L" is 32, "M" is 8 and "N" is 1/12, then one rotary body 102. Thus when rotary body rotates 45 degrees, rotary body 102 rotates 180 degrees.

On the other hand, one turn of rotary body 101 corresponds to 1/12 turn of rotary body 107, thus when rotary body 101 rotates 2,160 degrees, rotary body 107 rotates 180 degrees, i.e., an output shown in FIG. 4 is produced. A number of turns of rotary body 102 is calculated based on an absolute angle of rotary body 107, then a fine absolute angle of rotary body 101 is calculated based on an absolute angle of rotary body 102. In this case, an absolute rotational angle can be detected until rotary body 101 makes six turns.

When rotary bodies 101, 102 and 107 are integrated into housing 110, a rotational reference of second rotary body 102 sometimes deviates from that of third rotary body 107. FIG. 5 shows the deviated status. If the deviation is great, a number of rotations of rotary body 102 could be miscalculated, in other words, an absolute angle of rotary body 101 is calculated deviating by +45 or −45 degrees. This deviation can be corrected by taking the following steps:

1-1. Rotary bodies 101, 102 and 107 are integrated into housing 110. Then transmit a code, which activates a mode calculating a deviated amount, to micro-processor 114 via a communication line.

1-2. Rotate rotary body 101 ±one turn in the vicinity of the rotation reference, and detect absolute rotational angle "x" of rotary body 107 with respect to the rotation reference of rotary body 102 shown in FIG. 5, and find a difference between absolute rotational angle "x" and absolute rotational angle "y" that is with respect to the rotation reference of rotary body 107.

1-3. Transmit a code, which changes a deviation calculating mode to a regular mode, via a communication line to micro-processor 114 shown in FIG. 6.

1-4. After that, whenever the power is turned on, an absolute angle of rotary body 107 is corrected this difference (x−y) before a number of rotations of the second rotary body 102 is calculated.

In FIG. 6, micro-processor 114 is coupled with detecting means 103 and 105 via AMPs 125, thus detecting means 103 and 105 supply their output signals to micro-processor 114 for calculating rotational angles. The results are transmitted as serial signals. Micro-processor 114 is coupled with non-volatile EEPROM 115 that stores reference signals of sine signals and cosine signals supplied from detecting means 103 and 105. For calculating an exact rotational angle, nonvolatile memory 115 is desirably provided, so that a deviation in rotation references can be overcome.

Next, a method of calculating an absolute angle is described using detecting means 103 that detects rotation of magnet 104 rigidly mounted to rotary body 102. A method of calculating an absolute angle using detecting means 105 is similar to this method, thus both the methods are described hereinafter.

In FIG. 1, rotation of rotary body 102 entails magnet 104 to rotate, which also rotates a direction of the magnetic field. This direction of the magnetic field is detected by detecting means 103. As shown in FIG. 7, detecting means 103 outputs sine signal 118 and cosine signal 119 with respect to a rotational angle of the magnetic field direction. In FIG. 7, respective signals are shown according to rotational angles of rotary body 101 shown on "x" axis. Those signals are supplied to micro-processor 114, which calculates tangent signal 120 using those signals. At this calculation, sine signal 118 is divided by cosine signal 119, thus even if sensitivities of the respective signals are changed by an ambient temperature, those changes can be canceled each other. As a result, an absolute rotational angle can be accurately calculated from tangent signal 120 even if the ambient temperature changes.

As shown in FIG. 7, since rotary body 102 gains speed with respect to rotary body 101, detecting means 103 outputs a signal having a shorter cycle. On the contrary, rotary body 107 loses speed with respect to rotary body 101, thus detecting means 105 outputs a signal having a longer cycle.

FIG. 8 shows an output of detecting means 103. A difference occurs between reference 121 of sine signal 118 and reference 122 of cosine signal 119. Without correcting this difference, calculating tangent signal 120 does not result in an exact absolute rotational angle. Thus the steps below are preferably followed:

2-1. Rotary bodies 101, 102 and 107 are integrated into housing 110. Then transmit a code that activates a mode calculating references of those rotary bodies into micro-processor 114 via the communication line.

2-2. Rotate first rotary body 101 so that rotary body 102 rotates over one turn, and detect respective max. and min. values of sine signal 118 and cosine signal 119.

2-3. Calculate (max. value+min. value)/2, and find results as reference 121 and reference 122. Store those references in non-volatile memory 115.

2-4. Transmit a code that changes the deviation calculating mode to the regular mode via the communication line to micro-processor 114.

2-5. After that, whenever the power is turned on, read-out references 121, 122 from memory 115, then convert them into corresponding sine signal 118 and cosine signal 119 before tangent signal 120 is calculated. Finally, calculate an absolute rotational angle of magnet 103.

Although an absolute rotational angle calculated from the signal supplied from detecting means 103 changes, an absolute rotational angle from detecting means 105 might not change. In this case, an abnormal event occurs in detecting means 103, 105, rotary body 102, or rotary body 107. If such a case happens, transmit a code indicating that an abnormality occurs in the rotational angle detecting sensor instead of transmitting a calculated absolute rotational angle of rotary body 101 via the communication line, thereby preventing the main system from malfunction.

Although the absolute rotational angle calculated from the signal supplied from detecting means 103 does not change, the absolute rotational angle from detecting means 105 might change. In this case, the same countermeasure can be taken.

A number of rotary bodies that link rotary bodies 101, 102 and third rotary body 107 is not limited to this embodiment as long as one of them rotates at a faster speed than rotary body 101 and another one rotates at a slower speed than rotary body 101.

Figure 9:
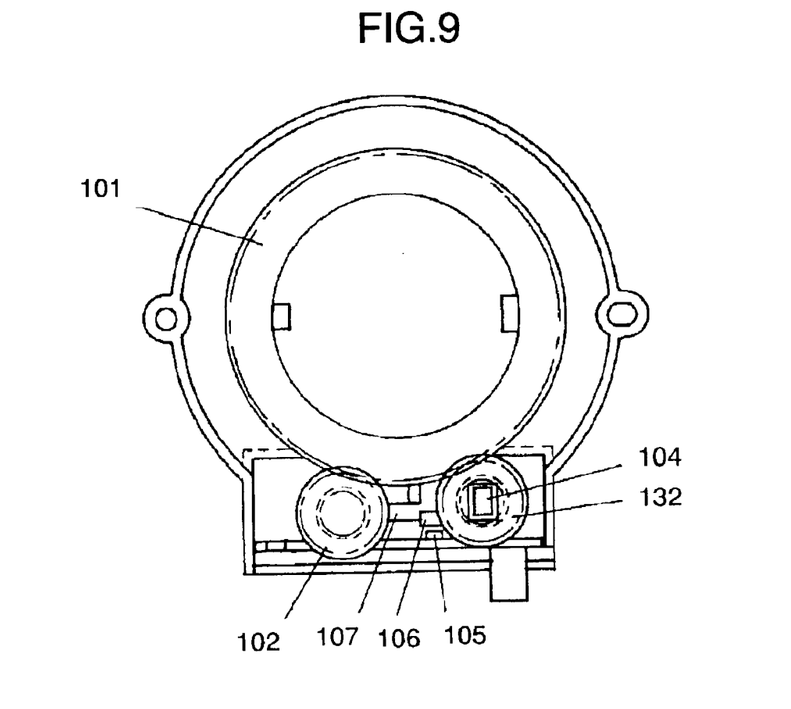
FIG. 9 is another plan view illustrating a rotational-angle detecting sensor in accordance with the first embodiment of the present invention.

In this embodiment, rotary body 102 disposed between rotary bodies 101 and 107 is used for detecting an absolute angle accurately. However, as shown in FIG. 9, second rotary body 132 can be linked independent of first rotary body 101, and a fine absolute angle is detected using rotary body 132. This case involves a transmission mechanism for reducing a speed with respect to rotary body 101.

Next, the angle sensor including such a detecting sensor is detailed.

Figure 10:
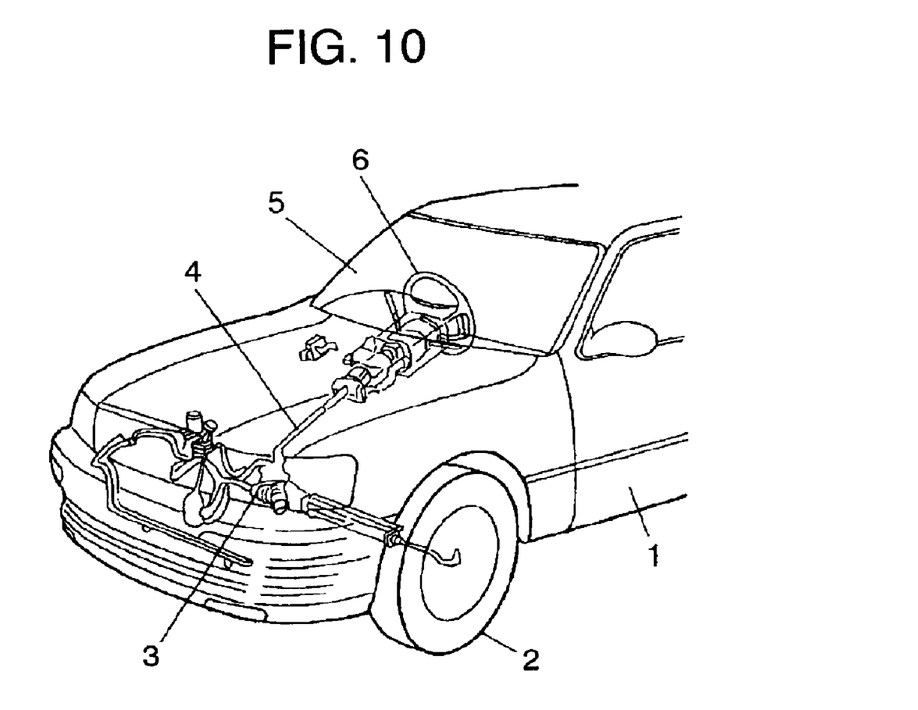
FIG. 10 is a perspective view illustrating an essential part of a car in accordance with a first and a second exemplary embodiments of the present invention.
Figure 11:
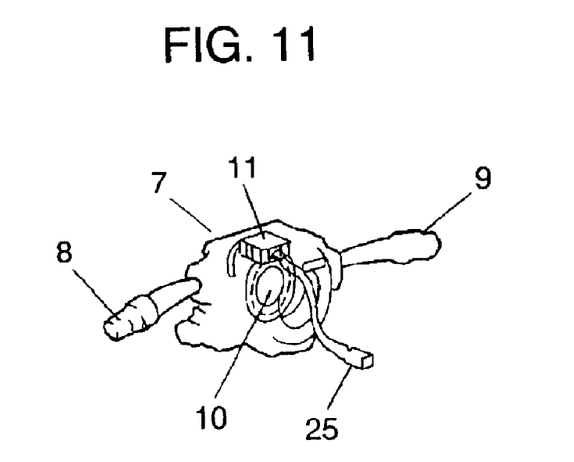
FIG. 11 is a perspective view of a combination switch in accordance with the first and the second embodiments of the present invention.

In FIG. 10, a car body 1 is supported by four tires 2, and front two tires are coupled with steering device 3, which links to a lower end of shaft 4. An upper end of shaft 4 extends into cabin 5, where the upper end is coupled with steering wheel 6. In a vicinity of the coupling section of shaft 4 and steering wheel 6, combination switch 7 shown in FIG. 11 is disposed.

Combination switch 7 includes wiper switch 8 and blinker switch 9. Shaft 4 extends through through-hole 10 at the center of switch 7. Angle sensor 11 is mounted around through-hole 10.

Figure 12:
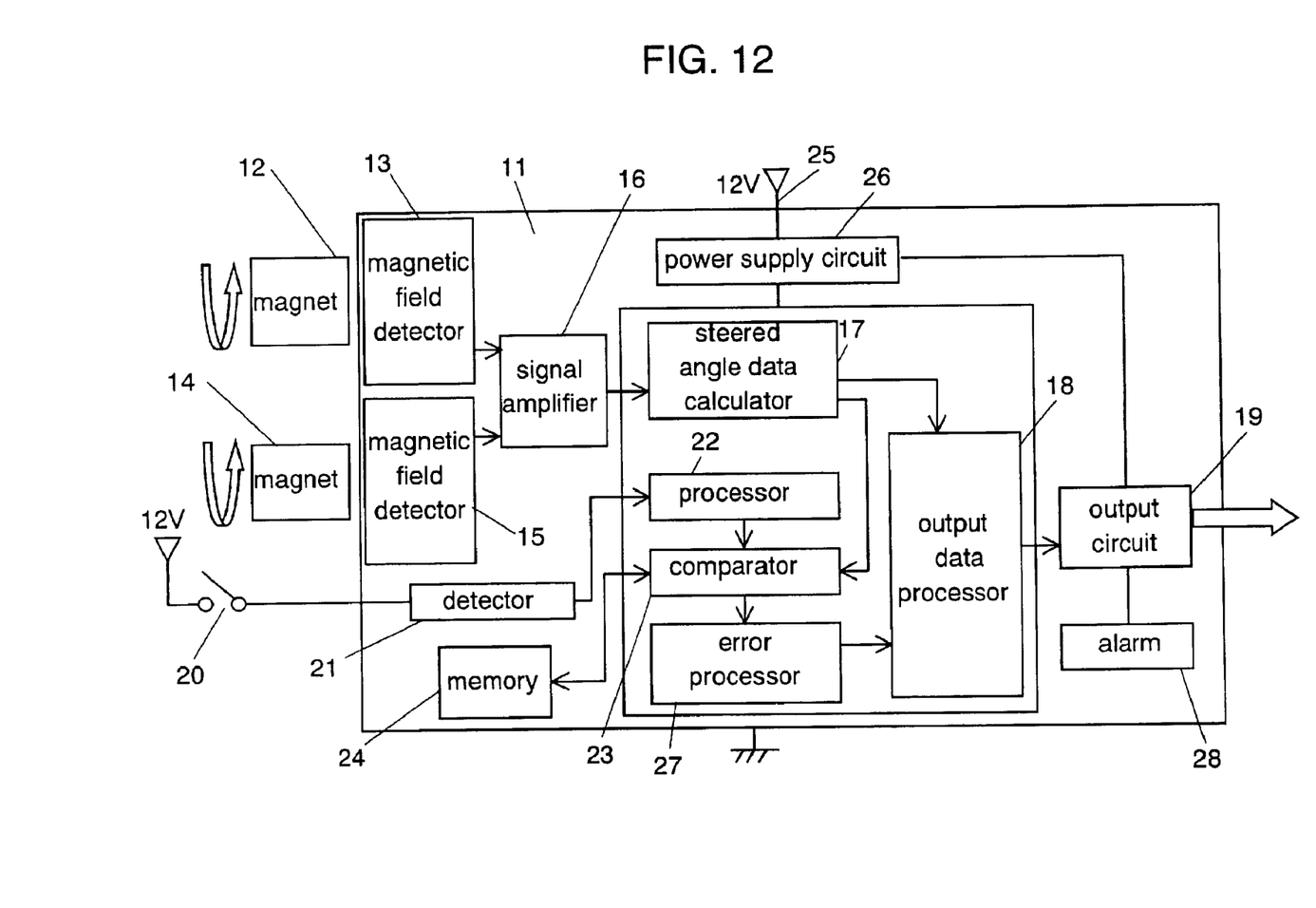
FIG. 12 shows a control circuit of an angle sensor in accordance with the first embodiment of the present invention.

FIG. 12 shows a circuit diagram of angle sensor 11, and the circuit includes the following elements:

magnet 12 and magnetic field detector 13 both for detecting a steered amount of angular rotation (0–360 degrees) of steering wheel 6; and magnet 14 and magnetic field detector 15 both for detecting a steering direction and a number of turns of the steering wheel.

The foregoing elements constitute a detecting sensor that detects the steered amount of angular rotation. Magnets 12 and 14 correspond to magnets 104 and 106 shown in FIG. 3, and magnetic field detectors 13 and 15 correspond to detecting means 103 and 105. Rotary body 101 shown in FIG. 1 is linked with shaft 4 to spin. Data supplied from detectors 13 and 15 are amplified by signal amplifier 16, then calculated by steered-angle-data calculator 17. This calculation produces a turned angle data (hereinafter referred to as "steered angle data") that shows in which way (left or right) and how many angles steering wheel 6 is turned. The steered angle data is transmitted to the electronic governor (not shown) of the car via output-data processor 18 and output circuit 19. The elements such as calculator 17, processor 18, detector 21, processor 22, comparator 23 and the like constitute a governor of the angle sensor. Steered-angle-data calculator 17 corresponds to micro-processor 114 shown in FIG. 6, and signal amplifier 16 corresponds to AMP 125 in FIG. 6.

Based on this data, the governor carries out controls, e.g., at a sharp curve, such as activating the brake, adjusting a hardness of the suspension and restricting the accelerator from blowing gasoline.

In the foregoing structure, when combination switch 7 is repaired, switch 7 is detached together with steering wheel 6 from shaft 4. At this time, comparator 23 is operated so that memory 24 stores the updated steered angle data that is supplied from steered-angle-data calculator 17. In other words, memory 24 retains the steered angle data obtained just before angle sensor 11 is detached.

When the repair of switch 7 is completed, switch 7 and steering wheel 6 are mounted to shaft 4 again. Then calculator 17 outputs a steered angle data corresponding to a re-mounted condition to comparator 23, which then compares this data with the data stored in memory 24. If the two data do not agree with each other, comparator 23 outputs a signal to alarm 28, via error-processor 27, output data processor 18 and output circuit 19, for giving an alarm.

The alarm notices a repairman that the re-mounting of angle sensor 11 differs from the status before it was detached. Then the repairman corrects the mounting status of sensor 11, so that the alarm stops. As such, when sensor 11 is re-mounted as the status before it was detached, a driver can drive the car safely using the steered angle data supplied from sensor 11, which also contributes to various controls done by the electronic governor.

During such a repair work, starter 20 of the car is usually turned off. When detecting the turn-off of starter 20, detector 21 transmits a signal to comparator 23 via processor 22. Comparator 23 makes memory 24 store the updated steered angle data using this signal as a trigger. This structure allows memory 24 to retain the updated data automatically just before angle sensor 11 is detached. After the repair, switch 7 is re-mounted together with steering wheel 6 to shaft 4, then starter 20 is turned on for confirming whether or not every function works well. Detector 21 detects the confirmations and transmits a signal to comparator 23 via processor 22. Comparator 23 uses this signal as a trigger for recalling the steered angle data of just before the detachment of angle sensor 11 from memory 24. This mechanism allows the angle sensor to make sure automatically the matching with the shaft.

In the case that memory 24 is formed of an electrically erasable programmable read only memory (EEPROM), if angle sensor 11 is detached, and power via cable 25 and power supply circuit 26 is discontinued, memory 24 can keep retaining the steered angle data without an additional power supply.

In the demonstration discussed above, alarm 28 is disposed in angle sensor 11; however, it can be disposed outside angle sensor 11. In this case, an alarm is given with a signal from output circuit 19.

Exemplary Embodiment 2

Figure 13:
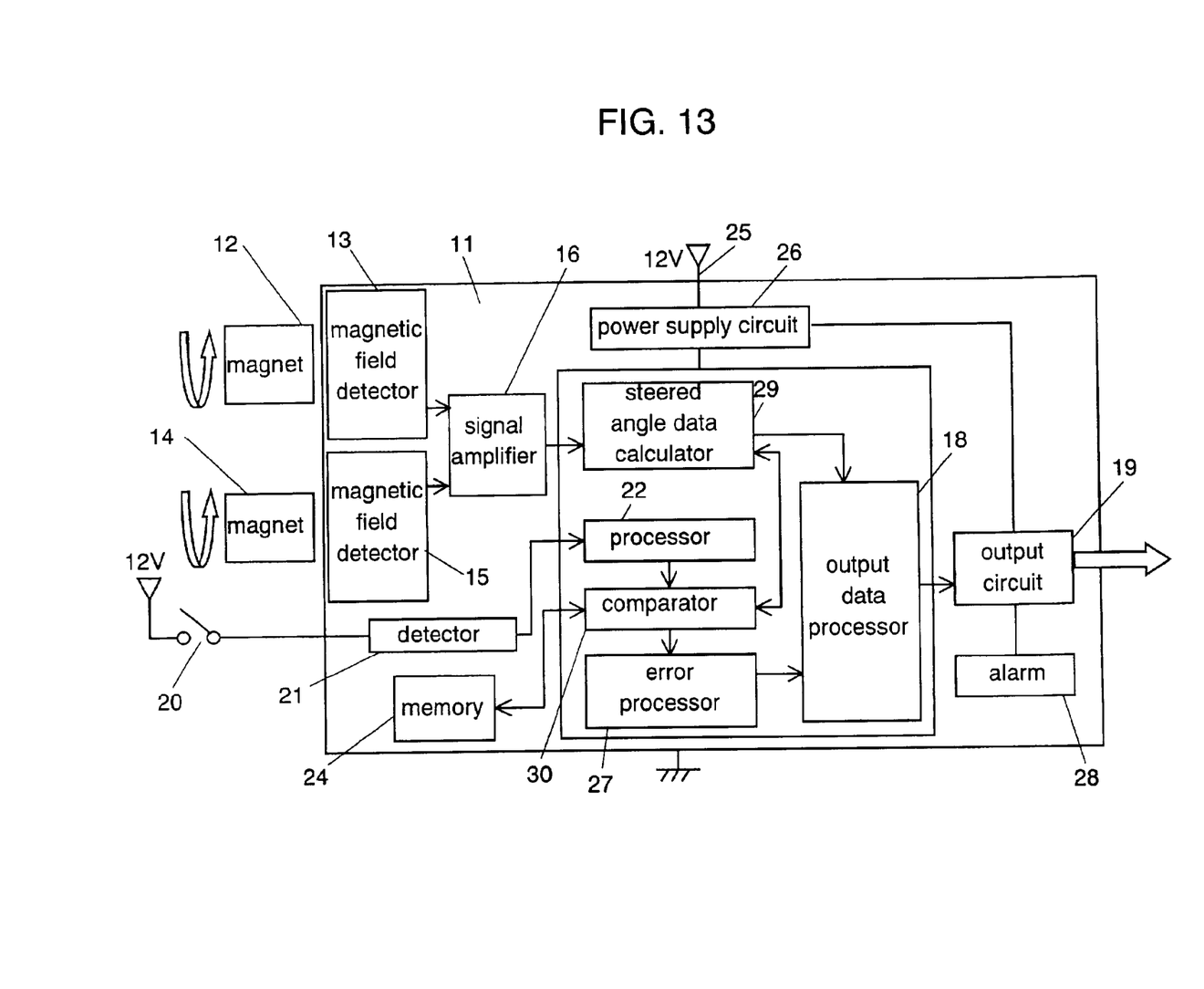
FIG. 13 shows a control circuit of an angle sensor in accordance with the second embodiment of the present invention.

FIG. 13 shows a circuit diagram of a steered angle detector in accordance with the second embodiment. In FIG. 13, similar elements to those in the first embodiment have the same reference marks.

When combination switch 7 is going to be repaired, the updated steered angle data is stored in memory 24 in the same manner as in the first embodiment. After the repair, switch 7 is re-mounted together with steering wheel 6 to shaft 4. Then steered-angle-data calculator 29 outputs a steered angle data corresponding to a status just after the re-mounting of sensor 11 to steered-angle-data comparator 30, which compares this data with the data stored in memory 24. When some discrepancy is found between these two data, comparator 30 outputs data to alarm 28, via error processor 27, output data processor 18 and output circuit 19, for giving an alarm. In this case, comparator 30 outputs the data of just before the detachment of sensor 11 to calculator 29 from memory 24. Calculator 29 uses the data to correct the present steered angle data. In other words, a difference between the two data is deducted from the steered angle data from now onward.

When the car should be moved immediately after the repair, this structure allows emergency drive with the driver informed of abnormal mounting of angle sensor 11.

In the previous descriptions, calculator 17 or 29, comparator 23 or 30, processor 22, error processor 27 and output data processor 18 constitute the electronic governor, which can be integrated in one micro-processor or formed of plural micro-processors. Signal amplifier 16, detector 21 and power supply circuit 26 are formed of a micro-processor. These elements can be integrated into the electronic governor, or structured discretely.

The car described in the foregoing embodiments can be an engine-powered car, a hybrid car powered by an engine or a motor, or an electric car driven by only a motor.

In the foregoing embodiments, the angle sensor is used in the steering device of the car; however, the angle sensor can be used in, e.g., a robot of which operated angle needs to be measured, so that a defective re-mounting of the angle sensor can be prevented.

What is claimed is:

1. A method of removing and replacing a sensor about a shaft, said method comprising the steps of:

storing first rotation data corresponding to amount of angular rotation indicated by said sensor obtained at a first time from said sensor;

removing and replacing the sensor;

obtaining second rotation data corresponding to amount of angular rotation indicated by said sensor obtained at a second time from said sensor following replacement of said sensor;

indicating if said first rotation data and said second rotation data are different.

2. A method of replacing a sensor about a shaft according to claim 1, wherein said amount of angular rotation includes:

number of turns;

direction of turning; and rotational angle.

3. A method of replacing a sensor according to claim 1, wherein said sensor is removed and replaced from a steering wheel shaft of a car.

4. A method of replacing a sensor according to claim 1, wherein at least one of said first rotation data and said second rotation data are stored in memory.

5. A method of replacing a sensor according to claim 1, further comprising the step of sounding an alarm responsive to indicating that said first and second rotation data are different.

6. A sensor unit for use with a shaft, comprising:

a detection unit for signaling a detected amount of rotation that said sensor unit has sensed; and a comparator for performing a comparison of said detected amount of rotation of said shaft in an expected same orientation at two different times and for indicating a discrepancy in said comparison.

7. A sensor unit according to claim 6, wherein said sensor unit is mountable about a steering wheel shaft of a car.

8. A sensor unit according to claim 6, further comprising a memory for storing amount of rotation for at least one of said two different times.

9. A sensor unit according to claim 6, further comprising an alarm which is sounded when said comparator indicates said discrepancy in said comparison.

10. A car comprising:

a car body;

a driving wheel for supporting said car body;

a shaft for steering said driving wheel with respect to said car body;

a steering wheel coupled to said shaft; and a sensor unit, comprising:

a detection unit for signaling a detected amount of rotation of said shaft that said sensor unit has sensed; and a comparator for performing a comparison of said detected amount of rotation of said shaft in an expected same orientation said shaft at two different times and for indicating a discrepancy in said comparison.

* * * * *

UNITED STATES PATENT AND TRADEMARK OFFICE
CERTIFICATE OF CORRECTION

PATENT NO. : 6,870,470 B2
DATED : March 22, 2005
INVENTOR(S) : Toshihiro Nomura et al.

It is certified that error appears in the above-identified patent and that said Letters Patent is hereby corrected as shown below:

<u>Column 8,</u>
Line 51, after "orientation" add -- of --.

Signed and Sealed this

Third Day of January, 2006

JON W. DUDAS
*Director of the United States Patent and Trademark Office*